(12) United States Patent
Fujita

(10) Patent No.: US 9,338,481 B2
(45) Date of Patent: May 10, 2016

(54) COMMUNICATION APPARATUS THAT PERFORMS STREAMING DISTRIBUTION, METHOD OF CONTROLLING COMMUNICATION APPARATUS, REPRODUCTION APPARATUS, METHOD OF CONTROLLING REPRODUCTION APPARATUS, AND STORAGE MEDIUM

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/451,501

(22) Filed: Aug. 5, 2014

(65) Prior Publication Data

US 2015/0046958 A1 Feb. 12, 2015

(30) Foreign Application Priority Data

Aug. 6, 2013 (JP) .................................. 2013-163129

(51) Int. Cl.
*H04N 7/173* (2011.01)
*H04N 21/2187* (2011.01)
*H04N 21/262* (2011.01)
*H04N 21/239* (2011.01)
(Continued)

(52) U.S. Cl.
CPC ........ *H04N 21/2187* (2013.01); *H04L 65/4084* (2013.01); *H04N 21/2393* (2013.01); *H04N 21/23424* (2013.01); *H04N 21/26258* (2013.01); *H04N 21/4113* (2013.01); *H04N 21/6125* (2013.01); *H04N 21/8456* (2013.01)

(58) Field of Classification Search
CPC ................... H04N 21/2187; H04N 21/23424; H04N 21/8456; H04N 21/6125; H04N 21/26258; H04N 21/4113; H04N 21/2393
USPC .......................................................... 725/93
See application file for complete search history.

(56) References Cited

U.S. PATENT DOCUMENTS

| | | | | | |
|---|---|---|---|---|---|
| 5,043,829 A | * | 8/1991 | Hahn | ................. | G11B 27/3054 360/15 |
| 6,825,858 B2 | * | 11/2004 | Sato | ........................ | H04L 29/06 348/552 |

(Continued)

OTHER PUBLICATIONS

Pantos et al. "HTTP Live Streaming draft-pantos-http-live-streaming-08" Informational Internet-Draft, Apple Inc., Mar. 23, 2012, p. 1-33.

*Primary Examiner* — Nasser Goodarzi
*Assistant Examiner* — Michael B Pierorazio
(74) *Attorney, Agent, or Firm* — Rossi, Kimms & McDowell LLP

(57) ABSTRACT

A communication apparatus capable of switching between videos to be each displayed on a reproduction apparatus based on video data subjected to streaming distribution, on a distributor side. A camera registers management information of a plurality of cameras capable of distributing images to a PC by streaming distribution in a camera management table. Selection of a camera that is to distribute images to the PC is received from a user on a camera selection screen of the camera. The camera management table is updated so as to distribute images from the selected camera to the PC. Upon receipt of a playlist acquisition request from the PC, the camera generates a playlist based on the updated camera management table, and sends the generated playlist to the PC as a response.

16 Claims, 14 Drawing Sheets

(51) Int. Cl.
*H04N 21/61* (2011.01)
*H04N 21/41* (2011.01)
*H04N 21/234* (2011.01)
*H04N 21/845* (2011.01)
*H04L 29/06* (2006.01)

(56) References Cited

U.S. PATENT DOCUMENTS

| | | | | |
|---|---|---|---|---|
| 7,174,561 B2* | 2/2007 | Bixby | H04N 21/44016 | 375/E7.023 |
| 7,567,592 B2* | 7/2009 | Kobayashi | G06F 3/14 | 345/208 |
| 8,099,473 B2* | 1/2012 | Biderman | H04N 7/17318 | 380/212 |
| 8,255,579 B2* | 8/2012 | Kikkawa | G09G 5/003 | 710/14 |
| 8,788,626 B2* | 7/2014 | Takagaki | G11B 27/105 | 709/219 |
| 8,812,846 B2* | 8/2014 | Tam | H04N 21/23473 | 713/168 |
| 8,898,338 B1* | 11/2014 | McGowan | H04L 65/607 | 709/248 |
| 8,914,833 B2* | 12/2014 | Yao | H04N 21/2393 | 725/93 |
| 8,918,821 B2* | 12/2014 | Losev | H04N 21/47214 | 725/100 |
| 8,959,241 B2* | 2/2015 | Gupta | H04N 21/8456 | 709/231 |
| 9,015,779 B2* | 4/2015 | Maxwell | H04N 21/47202 | 725/87 |
| 2005/0120132 A1* | 6/2005 | Hutter | H04L 65/1006 | 709/234 |
| 2006/0085553 A1* | 4/2006 | Rachwalski | G06F 17/30017 | 709/233 |
| 2008/0069071 A1* | 3/2008 | Tang | H04W 72/005 | 370/342 |
| 2008/0080596 A1* | 4/2008 | Inoue | G06F 3/14 | 375/211 |
| 2008/0152023 A1* | 6/2008 | Yoshida | G09G 5/006 | 375/257 |
| 2008/0285578 A1* | 11/2008 | DeLay | G06F 9/546 | 370/412 |
| 2009/0027405 A1* | 1/2009 | Kaga | G09G 5/006 | 345/520 |
| 2009/0150961 A1* | 6/2009 | Kabuto | G09G 5/006 | 725/118 |
| 2009/0153737 A1* | 6/2009 | Glen | G09G 5/006 | 348/571 |
| 2009/0157885 A1* | 6/2009 | Takatsuji | H04L 12/282 | 709/228 |
| 2009/0190040 A1* | 7/2009 | Watanabe | H04N 5/765 | 348/725 |
| 2009/0193490 A1* | 7/2009 | Stone | G09G 5/003 | 725/151 |
| 2009/0256963 A1* | 10/2009 | Sato | H04N 5/4401 | 348/554 |
| 2009/0260043 A1* | 10/2009 | Tatsuta | G09G 5/006 | 725/81 |
| 2009/0281643 A1* | 11/2009 | Higuchi | H04N 5/44 | 700/94 |
| 2009/0282437 A1* | 11/2009 | Malec | G06F 3/1423 | 725/40 |
| 2009/0284536 A1* | 11/2009 | Yoshida | H04L 12/2834 | 345/520 |
| 2009/0316004 A1* | 12/2009 | Kitamori | G04G 5/00 | 348/207.1 |
| 2010/0031299 A1* | 2/2010 | Harrang | H04N 21/4104 | 725/80 |
| 2010/0235472 A1* | 9/2010 | Sood | H04L 65/4092 | 709/219 |
| 2011/0004909 A1* | 1/2011 | Ogi | H04N 5/4403 | 725/81 |
| 2011/0047586 A1* | 2/2011 | Koizumi | H04N 21/4104 | 725/118 |
| 2011/0099594 A1* | 4/2011 | Chen | H04N 21/23439 | 725/105 |
| 2011/0154414 A1* | 6/2011 | Kimoto | H04N 5/775 | 725/78 |
| 2011/0206355 A1* | 8/2011 | Toba | H04N 5/44 | 386/355 |
| 2011/0292835 A1* | 12/2011 | Zhu | H04W 28/18 | 370/255 |
| 2012/0297410 A1* | 11/2012 | Lohmar | H04N 21/2407 | 725/14 |
| 2013/0007817 A1* | 1/2013 | Park | H04N 21/4104 | 725/81 |
| 2013/0086622 A1* | 4/2013 | Narushima | H04N 21/43635 | 725/138 |
| 2013/0104183 A1* | 4/2013 | Ogaki | G09G 5/00 | 725/127 |
| 2013/0159565 A1* | 6/2013 | Soyannwo | G06F 9/4445 | 710/33 |
| 2013/0232356 A1* | 9/2013 | Sato | G06F 1/3215 | 713/320 |
| 2013/0283333 A1* | 10/2013 | Sato | H04N 21/632 | 725/127 |

* cited by examiner

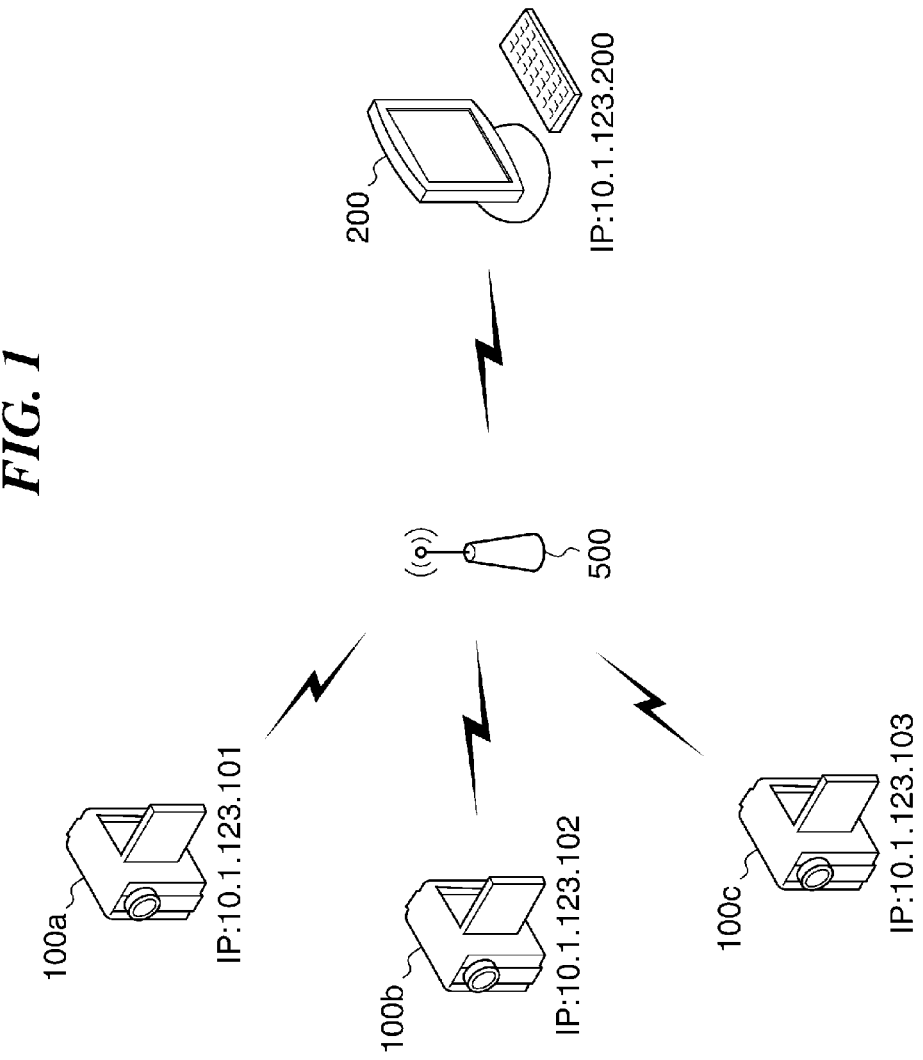

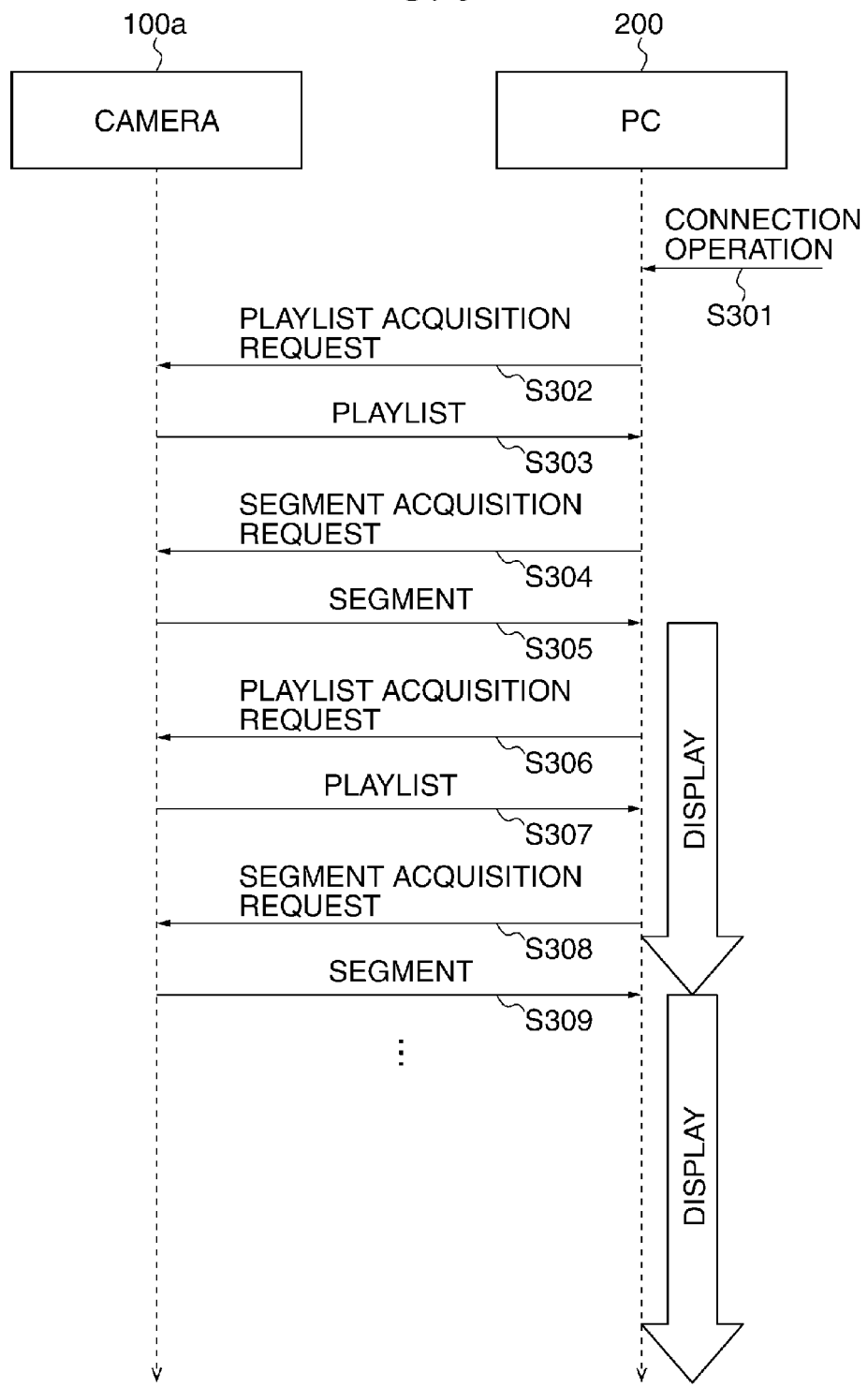

*FIG. 4A*

401 → #EXTM3U
402 → #EXT-X-TARGETDURATION:5
403 → #EXT-X-MEDIA-SEQUENCE:1

404 → #EXTINF:5,
405 → http://camera/segment1.ts

*FIG. 4B*

EXTM3U
EXT-X-TARGETDURATION:5
406 → #EXT-X-MEDIA-SEQUENCE:2

EXTINF:5,
407 → http://camera/segment2.ts

*FIG. 4C*

EXTM3U
EXT-X-TARGETDURATION:5
EXT-X-MEDIA-SEQUENCE:1

EXTINF:5,
http://10.1.123.101/segment1.ts

*FIG. 4D*

EXTM3U
EXT-X-TARGETDURATION:5
408 → #EXT-X-MEDIA-SEQUENCE:2

EXTINF:5,
409 → http://10.1.123.102/segment2.ts

FIG. 6A

| No | CAMERA NAME | IP ADDRESS | VIDEO SOURCE |
|----|-------------|--------------|--------------|
| 1 | CamA | 10.1.123.101 | YES |
| 2 | CamB | 10.1.123.102 | NO |
| 3 | CamC | 10.1.123.103 | NO |

FIG. 6B

| No | CAMERA NAME | IP ADDRESS | VIDEO SOURCE |
|----|-------------|--------------|--------------|
| 1 | CamA | 10.1.123.101 | NO |
| 2 | CamB | 10.1.123.102 | YES |
| 3 | CamC | 10.1.123.103 | NO |

FIG. 6C

| No | CAMERA NAME | IP ADDRESS | VIDEO SOURCE | PING RESPONSE |
|----|-------------|--------------|--------------|---------------|
| 1 | CamA | 10.1.123.101 | NO | RECEIVED |
| 2 | CamB | 10.1.123.102 | YES | RECEIVED |
| 3 | CamC | 10.1.123.103 | NO | NOT RECEIVED |

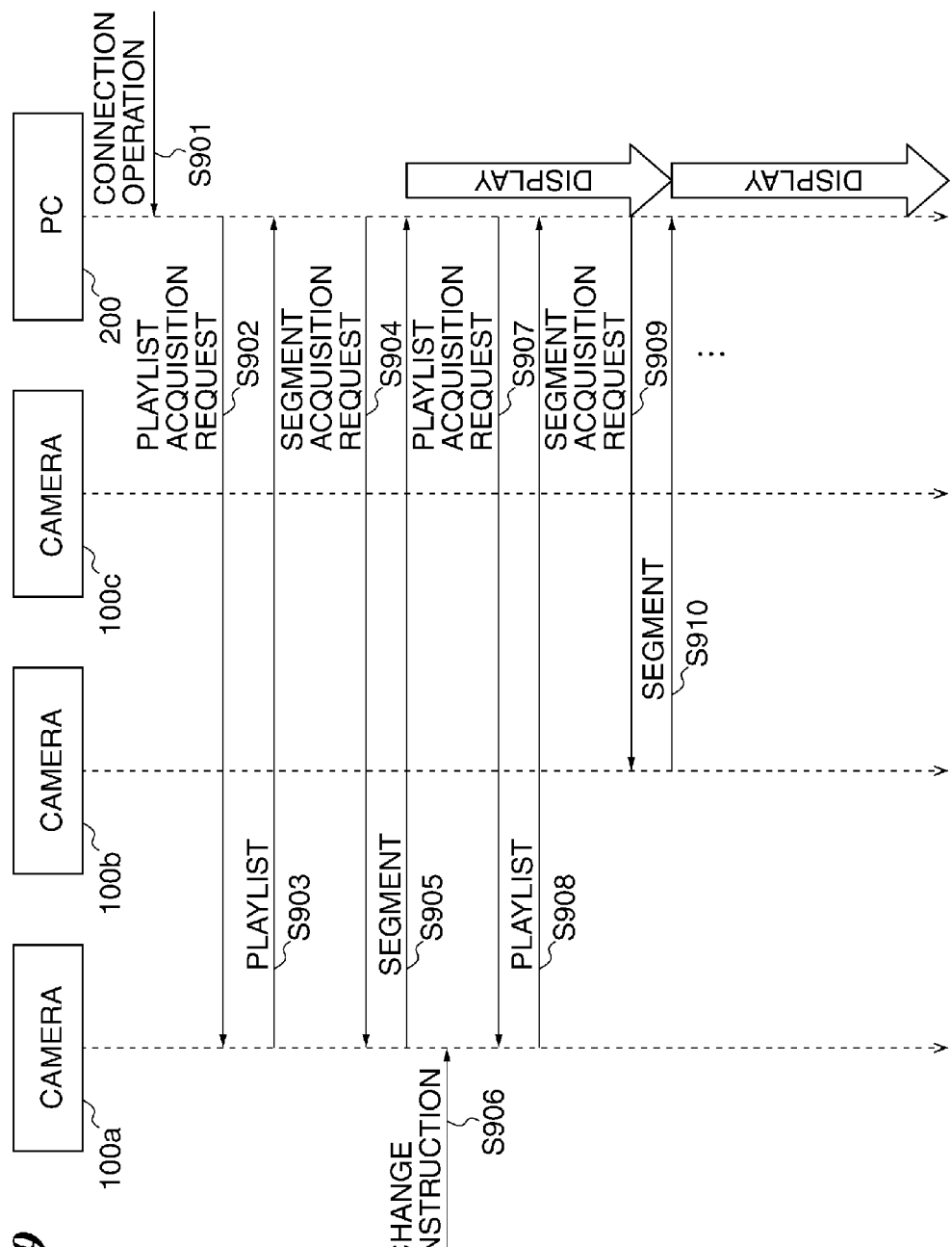

*FIG. 14*

```
#EXTM3U
#EXT-X-TARGETDURATION:20
#EXT-X-MEDIA-SEQUENCE:1

#EXTINF:20,
http://10.1.123.101/segment1.ts
#EXTINF:10,
http://10.1.123.103/segment1.ts
#EXTINF:10,
http://10.1.123.102/segment1.ts
```

COMMUNICATION APPARATUS THAT PERFORMS STREAMING DISTRIBUTION, METHOD OF CONTROLLING COMMUNICATION APPARATUS, REPRODUCTION APPARATUS, METHOD OF CONTROLLING REPRODUCTION APPARATUS, AND STORAGE MEDIUM

BACKGROUND OF THE INVENTION

1. Field of the Invention

The present invention relates to a communication apparatus that performs streaming distribution over a network, a method of controlling the communication apparatus, a reproduction apparatus, a method of controlling the reproduction apparatus, and a storage medium.

2. Description of the Related Art

In recent years, as a technique for performing streaming distribution over a network, there has been proposed HTTP Live Streaming (hereinafter referred to as "HLS"). HLS is an HTTP-based media streaming communication protocol, which realizes streaming between a distribution server equipped with a streaming server function and a player apparatus equipped with a client function. More specifically, the player apparatus sends a playlist acquisition request for acquisition of a playlist to the distribution server. Then, the player apparatus sends a request for distribution of video segment data (hereinafter referred to as "segments") to a segment acquisition URL described in the acquired playlist for use in acquiring segments, decodes and reproduces the acquired segments, and displays the reproduced segments on a monitor provided in the player apparatus. By executing a series of the above-described processing operations, it is possible to realize streaming.

HLS can be applied to various networking products. For example, by applying the server function to a digital camera (camera), and the client function to an application on a PC (personal computer), it is possible to build a system for displaying images photographed by the camera (photographed moving images) on the PC over a network on a real-time basis.

Further, the system of HLS is not limited to one-to-one data communication, but it is also possible to build a system for selectively displaying images photographed by a plurality of cameras connected to the network, on the PC. In this case, the PC selects a camera photographing a moving image desired to be displayed, and accesses the selected camera to acquire a playlist and segments.

However, in the above-described system for selectively displaying, on the PC, images photographed by a plurality of cameras connected to the network, it is presupposed that video source switching is performed by the PC which is a player apparatus. This is because HLS uses HTTP, and hence all requests are issued from the PC which is a client, so that the camera which is a server cannot send a request for changing a video source to the PC. Thus, according to the conventional technique, it is difficult to provide the camera with a user interface, such as a video source-changing button.

SUMMARY OF THE INVENTION

The present invention provides a technique which, in a network environment in which streaming distribution of video data can be performed from a plurality of communication apparatuses to a reproduction apparatus, makes it possible to switch between videos to be displayed on the reproduction apparatus based on the video data subjected to the streaming distribution, from a video distributor side.

In a first aspect of the present invention, there is provided a communication apparatus that distributes, according to a segment request from an external apparatus, segments obtained by dividing video data to the external apparatus, comprising a generation unit configured to generate a segment list describing information on a distribution source of each segment, a transmission unit configured to transmit the segment list in response to a request from the external apparatus, for acquiring the segment list, a holding unit configured to hold management information of a plurality of other communication apparatuses that are capable of distributing data to the external apparatus, and a reception unit configured to receive, from a user, selection of a communication apparatus that is to distribute data to the external apparatus, out of the communication apparatuses of which the management information is held by the holding unit, wherein when the selection of a communication apparatus that is to distribute data to the external apparatus is received from the user by the reception unit, the generation unit generates a segment list such that the communication apparatus selected by the user is set as the distribution source of the segment, and wherein the segment list generated such that the communication apparatus selected by the user is set as the distribution source of the segment is transmitted by the transmission unit in response to the request from the external apparatus for acquiring the segment list.

In a second aspect of the present invention, there is provided a reproduction apparatus that communicates with a communication apparatus that is capable of transmitting segments obtained by dividing video data, and a plurality of other communication apparatuses that are capable of communicating with the communication apparatus, comprising a transmission unit configured to transmit a request for a segment list describing information on a distribution source of each segment to the communication apparatus, a list reception unit configured to receive the segment list from the communication apparatus, a segment reception unit configured to receive the segment from a communication apparatus determined, based on the information on the distribution source described in the segment list received by the list reception unit, out of a communication apparatus which is a transmission source of the segment list and one or a plurality of other communication apparatuses connected to the communication apparatus which is the transmission source of the segment list, and a reproduction unit configured to reproduce video data based on the segment received by the segment reception unit, wherein when segments have been received by the segment reception unit from each communication apparatus determined based on information on all distribution sources described in the segment list, the transmission unit again transmits a segment list acquisition request to the communication apparatus of the plurality of communication apparatuses, which is the transmission source of the segment list.

In a third aspect of the present invention, there is provided a method of controlling a communication apparatus that distributes, according to a segment request from an external apparatus, segments obtained by dividing video data to the external apparatus, comprising generating a segment list describing information on a distribution source of each segment, transmitting the segment list in response to a request from the external apparatus, for acquiring the segment list, holding management information of a plurality of other communication apparatuses that are capable of distributing data to the external apparatus, and receiving, from a user, selection of a communication apparatus that is to distribute data to the external apparatus, out of the communication apparatuses of which the management information is held by said holding, wherein when the selection of a communication apparatus that is to distribute data to the external apparatus is received from the user by said receiving, said generating includes generating a segment list such that the communication apparatus selected by the user is set as the distribution source of the segment, and wherein said transmitting includes transmitting the segment list generated such that the communication apparatus selected by the user is set as the distribution source of the segment, in response to the request from the external apparatus for acquiring the segment list.

In a fourth aspect of the present invention, there is provided a method of controlling a reproduction apparatus that communicates with a communication apparatus that is capable of transmitting segments obtained by dividing video data, and a plurality of other communication apparatuses that are capable of communicating with the communication apparatus, comprising transmitting a request for a segment list describing information on a distribution source of each segment to the communication apparatus, receiving the segment list from the communication apparatus, receiving the segment from a communication apparatus determined, based on the information on the distribution source described in the received segment list, out of a communication apparatus which is a transmission source of the segment list and one or a plurality of other communication apparatuses connected to the communication apparatus which is the transmission source of the segment list, and reproducing video data based on the received segment, wherein said transmitting includes transmitting, when segments have been received from each communication apparatus determined based on information on all distribution sources described in the segment list, a segment list acquisition request to the communication apparatus of the plurality of communication apparatuses, which is the transmission source of the segment list.

In a fifth aspect of the present invention, there is provided a non-transitory computer-readable storage medium storing a computer-executable program for executing a method of controlling a communication apparatus that distributes, according to a segment request from an external apparatus, segments obtained by dividing video data to the external apparatus, wherein the method comprises generating a segment list describing information on a distribution source of each segment, transmitting the segment list in response to a request from the external apparatus, for acquiring the segment list, holding management information of a plurality of other communication apparatuses that are capable of distributing data to the external apparatus, and receiving, from a user, selection of a communication apparatus that is to distribute data to the external apparatus, out of the communication apparatuses of which the management information is held by said holding, wherein when the selection of a communication apparatus that is to distribute data to the external apparatus is received from the user by said receiving, said generating includes generating a segment list such that the communication apparatus selected by the user is set as the distribution source of the segment, and wherein said transmitting includes transmitting the segment list generated such that the communication apparatus selected by the user is set as the distribution source of the segment, in response to the request from the external apparatus, for acquiring the segment list.

In a sixth aspect of the present invention, there is provided a non-transitory computer-readable storage medium storing a computer-executable program for executing a method of controlling a reproduction apparatus that communicates with a communication apparatus that is capable of transmitting segments obtained by dividing video data, and a plurality of other communication apparatuses that are capable of communicating with the communication apparatus, wherein the method comprises transmitting a request for a segment list describing information on a distribution source of each segment to the communication apparatus, receiving the segment list from the communication apparatus, receiving the segment from a communication apparatus determined, based on the information on the distribution source described in the received segment list, out of a communication apparatus which is a transmission source of the segment list and one or a plurality of other communication apparatuses connected to the communication apparatus which is the transmission source of the segment list, and reproducing video data based on the received segment, wherein said transmitting includes transmitting, when segments have been received from each communication apparatus determined based on information on all distribution sources described in the segment list, a segment list acquisition request to the communication apparatus of the plurality of communication apparatuses, which is the transmission source of the segment list.

Further features of the present invention will become apparent from the following description of exemplary embodiments (with reference to the attached drawings).

BRIEF DESCRIPTION OF THE DRAWINGS

FIG. 1 is a diagram showing an example of a network system to which three cameras as communication apparatuses according to a first embodiment of the present invention are connected.

FIG. 3 is a sequence diagram showing a communication order in streaming distribution between one camera and the PC.

FIG. 4A is a diagram showing an example of a playlist generated in a step in FIG. 3.

FIG. 4B is a diagram showing an example of a playlist sent in a step in FIG. 3.

FIG. 4C is a diagram showing an example of a playlist sent to the PC in a step in FIG. 9.

FIG. 4D is a diagram showing an example of a playlist sent to the PC in a step in FIG. 9.

FIG. 6A is a diagram showing an example of a camera management table generated in a step in FIG. 5.

FIG. 6B is a diagram showing an example of a camera management table updated in a step in FIG. 7.

FIG. 6C is a diagram showing an example of a camera management table generated in a fourth embodiment of the present invention.

FIG. 9 is a sequence diagram showing a communication order in streaming distribution between the three cameras and the PC.

FIG. 14 is a diagram showing an example of a playlist generated by the camera as the communication apparatus according to the fifth embodiment.

DESCRIPTION OF THE EMBODIMENTS

Figure 2A:
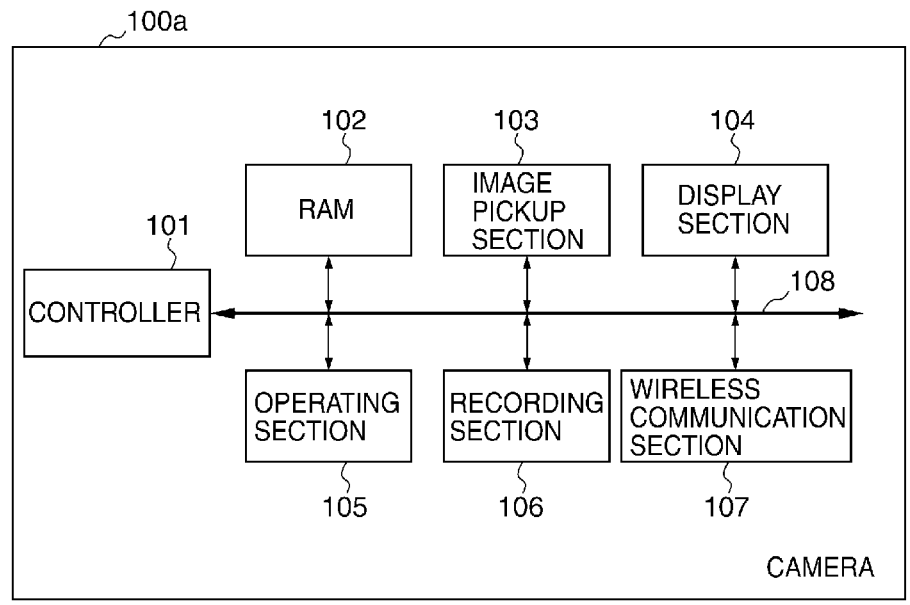
FIG. 2A is a block diagram of the camera appearing in FIG. 1.

The present invention will now be described in detail below with reference to the accompanying drawings showing embodiments thereof.

FIG. 1 is a diagram showing an example of a network system to which three cameras as communication apparatuses according to a first embodiment of the present invention are connected.

Referring to FIG. 1, cameras 100a, 100b, and 100c are each an image pickup apparatus that is equipped with a wireless communication function and is capable of photographing moving images and still images, and are each an example of a communication apparatus equipped with the streaming server function described hereinabove. A PC 200 is an information processing apparatus equipped with the wireless communication function, such as a personal computer and a mobile information terminal, and is an example of a player apparatus that is capable of receiving and viewing a moving image, etc., streaming-distributed e.g. from the camera 100a by wireless communication. An access point (AP) 500 is a wireless LAN access point equipped with a router function.

The cameras 100a to 100c and the PC 200 are each capable of establishing wireless LAN communication connection with the access point 500 in an infrastructure mode. The cameras 100a to 100c and the PC 200 have IP addresses set in advance, respectively, and can perform mutual communicate by IP address designation using a router function of the access point 500. For example, the cameras 100a to 100c and the PC 200 are set to the following IP addresses:

camera 100a: 10.1.123.101
camera 100b: 10.1.123.102
camera 100c: 10.1.123.103
PC 200: 10.1.123.200

The PC 200 holds URI information in advance, used for acquiring a playlist by the above-described streaming technique. This URI is "http://10.1.123.101/Playlist", and the playlist is sent only from the camera 100a.

The cameras 100a to 100c each perform image pickup processing using an image pickup section thereof. In the cameras 100b and 100c, the streaming server function is enabled. These settings are initial settings of the illustrated network system.

Although the illustrated network system is on a simple LAN (local area network), this is not limitative. The network system may be on a WAN (wide area network) using e.g. a telephone line network, in which a network to which the cameras 100a to 100c are connected and a network to which the PC 200 is connected are different.

FIG. 2A is a block diagram of the camera 100a appearing in FIG. 1. Note that the cameras 100a to 100c have substantially the same configuration, and hence only the camera 100a will be described.

Referring to FIG. 2A, the camera 100a includes a controller 101, a RAM 102, an image pickup section 103, a display section 104, an operating section 105, a recording section 106, a wireless communication section 107, and an internal bus 108.

The controller 101 includes a CPU (Central Processing Unit) and a ROM, neither of which is shown, and controls all processing blocks constituting the camera 100a. The controller 101 executes processing programs corresponding to a streaming starting process, a camera selection process, a playlist transmission process, and a segment transmission process. These processes will be described in detail hereinafter. The ROM of the controller 101 stores the above-mentioned processing programs.

Instead of controlling the overall operation of the apparatus by the controller 101, a plurality of control hardware units may share the processes to thereby control the overall operation of the apparatus.

The RAM 102 is a memory mainly used as a work area for the controller 101, and an area for temporarily storing data. The RAM 102 is also used for storing a camera management table shown in FIG. 6A.

The image pickup section 103 is a processing block that includes an optical lens, a CMOS sensor, a digital image processor, and so forth, none of which are shown, and acquires a photographed image by converting an analog signal input through the optical lens to digital data. A photographed image acquired by the image pickup section 103 is temporarily stored in the RAM 102, and is processed under the control of the controller 101. For example, the image is recorded in a recording medium (not shown) by the recording section 106, and is transmitted to an external apparatus (e.g. PC 200) via the wireless communication section 107.

The image pickup section 103 further includes a lens controller (not shown), and controls zooming, focusing, aperture adjustment, and so forth, based on commands from the controller 101.

The display section 104 is comprised of a liquid crystal panel or an organic EL panel, and displays an operation screen, a photographed image, etc., based on commands from the controller 101. Note that the camera 100a is not necessarily required to incorporate the display section 104. The camera 100a is only required to be capable of connecting to the display section 104 which may be incorporated or may be externally provided, and have a display control function for controlling the display on the display section 104.

The operating section 105 is comprised of buttons, a cross key, and a touch panel, a remote controller, and so forth, and receives an operation instruction from a user. Operation information input from the operating section 105 is sent to the controller 101. The controller 101 executes the control of the processing blocks based on the received operation information.

The recording section 106 is a processing block that is comprised of a large-capacity recording medium (not shown) and stores and reads various data in and from the recording medium based on commands from the controller 101. The recording medium is implemented e.g. by an incorporated flash memory, an incorporated hard disk, or a removable memory card. The recording medium may be configured to be removable from the camera 100a, or may be incorporated in the camera 100a. That is, the camera 100a is only required to include a unit which makes it possible to access the recording medium.

The wireless communication section 107 is a processing block that includes an antenna, wireless LAN processing hardware, and so forth, none of which are shown, and performs wireless communication by a method based on IEEE 802.11n/a/g/b.

Further, the wireless communication section 107 connects to the access point 500 by wireless communication, and wirelessly communicates with the PC 200 via the access point 500. Note that the method of communication by the wireless communication section 107 is not limited to IEEE 802.11n/a/g/b. For example, IEEE 802.11ac may be employed, or communication based on a standard different from that of the wireless LAN (e.g. infrared communication or Bluetooth (registered trademark)) may be employed.

The internal bus 108 is a bus that interconnects the processing blocks of the camera 100a.

Figure 2B:
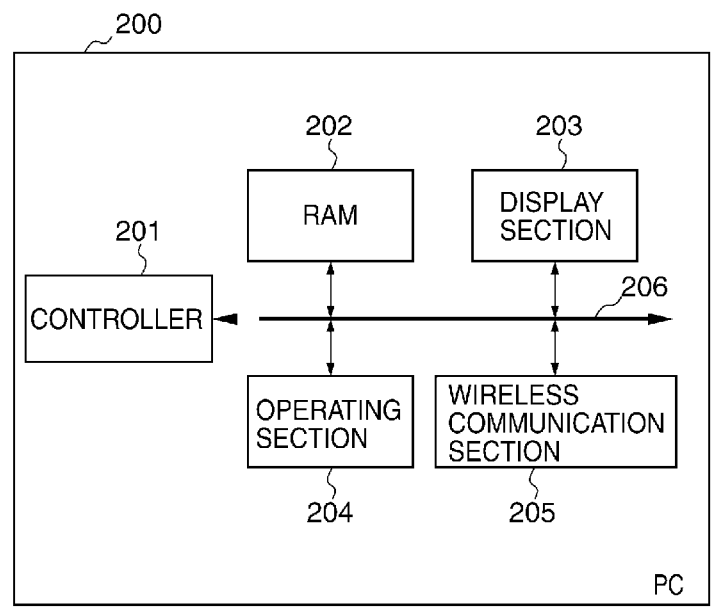
FIG. 2B is a block diagram of a PC appearing in FIG. 1.

FIG. 2B is a block diagram of the PC 200 appearing in FIG. 1.

Referring to FIG. 2B, the PC 200 includes a controller 201, a RAM 202, a display section 203, an operating section 204, a wireless communication section 205, and an internal bus 206.

The controller 201 includes a CPU and a ROM, neither of which is shown, and controls all processing blocks constituting the PC 200. The controller 201 executes a processing program for acquiring a playlist (see FIG. 3) from the camera 100a, acquiring segments based on the acquired playlist, and displaying the acquired segments. The ROM in the controller 201 stores the above-mentioned processing program.

The RAM 202 is a memory mainly used as a work area for the controller 201. The RAM 202 is also used as an area for temporarily storing a photographed image received from the camera 100a.

The display section 203 is comprised of a liquid crystal panel or the like, and displays a photographed image received from the camera 100a based on commands from the controller 201. The operating section 204 is comprised of buttons, a cross key, and a touch panel, a remote controller, and so forth, and receives an operation instruction from a user. Operation information input from the operating section 204 is sent to the controller 201. The controller 201 controls the processing blocks based on the received operation information.

The wireless communication section 205 is a processing block that includes an antenna, wireless LAN processing hardware, and so forth, none of which are shown, and performs wireless communication by the method based on IEEE 802.11n/a/g/b.

Further, the wireless communication section 205 connects to the access point 500 by wireless communication, and wirelessly communicates with the camera 100a via the access point 500.

The internal bus 206 is a bus that interconnects the processing blocks of the PC 200.

Next, a description will be given of the HLS protocol that realizes communication between the camera 100a and the PC 200 when a moving image photographed by the camera 100a is viewed by streaming reproduction on the PC 200, with reference to FIG. 3. It is assumed that as an initial state, wireless communication connection has been established between the camera 100a and the PC 200. Further, it is assumed that the PC 200 holds the URI information for use in sending a request for acquiring a playlist from the camera 100a, in advance. Further, it is assumed that the camera 100a is performing image pickup processing by the image pickup section 103, and its streaming server function for transmitting a photographed moving image by streaming has been enabled.

FIG. 3 is a sequence diagram showing a communication order in streaming distribution between the camera 100a and the PC 200.

Referring to FIG. 3, in a step S301, an instruction for connecting to the camera 100a is input by a user's operation on the PC 200. For example, a streaming application screen (not shown) is displayed by a streaming application on the display section 203, and the user selects a camera distributing a streaming image which he/she desires to display, to thereby input the connection instruction. Upon detection of input of the connection instruction, the PC 200 sends a playlist acquisition request to the camera 100a according to the streaming application. The playlist acquisition request is a request message sent using the HTTP request, and a URI used for the request is "http://camera/playlist", for example. In this URI, "camera" is a network host name of the camera 100a.

In a step S302, the controller 101 of the camera 100a receives the playlist acquisition request (moving image reproduction request) sent from the PC 200 via the wireless communication section 107.

The controller 101 analyzes the URI to thereby determine that the received request is a playlist acquisition request, and generates a playlist in the RAM 102. FIG. 4A shows an example of the playlist generated in this step.

Referring to FIG. 4A, a reference numeral 401 denotes tag information indicating that the file is in M3U format. A reference numeral 402 denotes tag information indicating the maximum reproduction time period of a segment described in the playlist, and in the illustrated example, the maximum reproduction time period is five seconds. A reference numeral 403 denotes tag information indicating a sequence number of the playlist, and in the illustrated example, the tag information 403 indicates that the sequence number is 1. A reference numeral 404 denotes tag information indicating the reproduction time period of a segment described in the playlist, and in the illustrated example, the tag information 404 indicates that the reproduction time period is five seconds. A reference numeral 405 denotes a URI for acquiring the segment (hereafter referred to as "segment acquisition URI"). A string in the segment acquisition URI 405 "segment1.ts" indicates a file name of the segment. The extension ".ts" indicates the file of the segment is in MPEG2 transport stream format. In the HLS protocol, the format of video segments and the format of audio segments are not particularly limited, and for example, the video segments may have H.264 format, and the audio segments may have HE-AAC format.

Referring again to FIG. 3, in a step S303, the controller 101 transmits the generated playlist to the PC 200 via the wireless communication section 107. The playlist is transmitted as an HTTP response.

In a step S304, the PC 200 sends a segment acquisition request to the camera 100a based on the segment acquisition URI described in the playlist acquired in the step S303. The segment acquisition request is a request message sent using the HTTP request, similarly to the playlist acquisition request, and as shown in FIG. 4A, the URI is described as "http://camera/segment1.ts".

The controller 101 of the camera 100a receives the segment acquisition request sent from the PC 200 via the wireless communication section 107. The controller 101 analyzes the URI to thereby determine that the received request is a segment acquisition request, and generates, using a photographed image input from the image pickup section 103, a segment in a file format of MPEG2 transport stream as five-second moving image data.

In a step S305, the controller 101 transmits the generated segment to the PC 200 via the wireless communication section 107. The segment is transmitted as an HTTP response. Upon receipt of the segment, the PC 200 performs decode processing on the segment, and then reproduces and displays the moving image on the display section 203. Note that in FIG. 3, a downward arrow on which "display" is written indicates a reproduction time period of the moving image on the PC 200.

In steps S306 to S309 following the step S305, the same processes as executed in the steps S302 to S305 are executed.

FIG. 4B shows an example of the playlist transmitted in the step S307.

Referring to FIG. 4B, the sequence number, denoted by a reference numeral 406, on the playlist is incremented by one to 2. In the segment acquisition URI, denoted by a reference numeral 407, description of the file name is changed such that the indicated segment is a second segment. However, this change is not necessarily required, and the file name may be described as "segment1.ts". If it is found by the analysis of the URI that the string "segment" is described after "camera/", the camera 100a determines that the received request is a segment acquisition request whatever the number is described after the string "segment". To simplify the explanation, the description is given taking, as an example, a case where one segment acquisition URI is described in the playlist shown in FIG. 4B.

Referring again to FIG. 3, segment transmission processing in the step S309 is executed before reproduction of the five-second moving image started in the step S305 is completed so as to realize seamless moving image reproduction on the display section 203 of the PC 200. This timing control is performed by the controller 201 of the PC 200. After the step S309, the same processing operations as in the steps S306 to S309 are repeated, which realizes seamless live streaming reproduction on the PC 200.

The description given thus far is the outline of one-to-one live streaming reproduction.

Next, a description will be given of the operation of the camera 100a of the present embodiment, focusing mainly on a process for switching a plurality of video sources at the video distributor.

Figure 5:
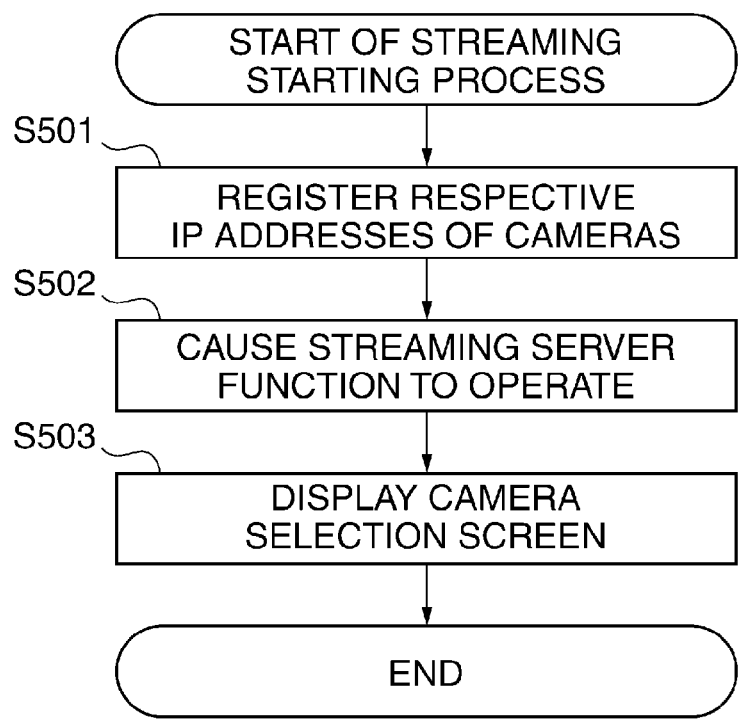
FIG. 5 is a flowchart of a streaming starting process performed by the camera appearing in FIG. 1.

FIG. 5 is a flowchart of a streaming starting process performed by the camera 100a of the present embodiment. The streaming starting process is realized by loading a program from the ROM of the controller 101 into the RAM 102, and executing the loaded program by the controller 101. Processes executed thereafter by the camera 100a are realized in the same manner. Further, the streaming starting process is started when the start of the streaming server function is instructed e.g. by a user operating a menu displayed on the digital camera 100.

First, before starting the streaming server function, in a step S501, the controller 101 performs processing for registering the IP addresses of the cameras 100a to 100c. More specifically, the controller 101 generates the camera management table in the ROM 102. FIG. 6A shows an example of the camera management table generated in this step.

Referring to FIG. 6A, a column of "No." indicates numbers assigned to registered cameras, respectively. A column of "camera name" indicates names for identifying the registered cameras, respectively. The "camera name" may be fixed in advance. Note that a value "CamA" represents the camera 100a which is the self-apparatus.

A column of "IP address" indicates respective IP addresses of registered cameras. The IP addresses of the cameras "CamB" and "CamC" which are not the self-apparatus are manually registered by the user e.g. by displaying an IP address input screen on the display section 104.

A column of "video source" indicates which camera is to transmit a photographed image (segments) to the player apparatus. One of the registered cameras has a value of "YES". In the initial setting of the "video source", the camera "CamA" which is the self-apparatus has a value of "YES". The camera management table generated in the step S501 is stored in the RAM 102 so long as the streaming server function started in a step S502 following the step S501 is in operation.

Referring again to FIG. 5, in the step S502, the controller 101 causes the streaming server function to operate to thereby make the self-apparatus capable of receiving a playlist acquisition request from the PC 200.

Figure 8A:
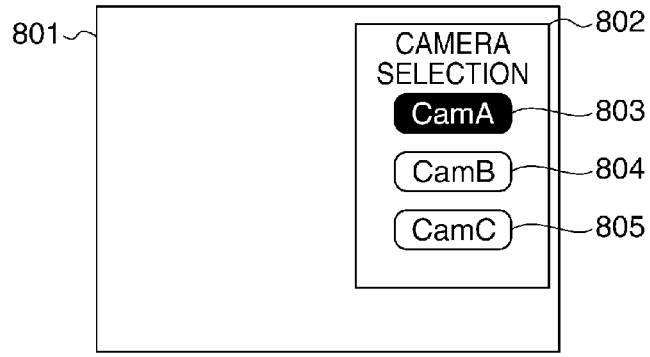
FIG. 8A is a diagram showing an example of a camera selection screen displayed on a display section of the PC in a step in FIG. 5.

In a step S503, the controller 101 displays a camera selection screen shown in FIG. 8A on the display section 104 to make the self-apparatus capable of receiving a camera selection instruction from the user via the operating section 105.

Referring to FIG. 8A, a reference numeral 801 denotes the camera selection screen displayed on the display section 104. The camera selection screen 801 displays an image photographed by the image pickup section 103. A reference numeral 802 denotes a camera selection area displayed on the photographed image. In the camera selection area 802, a button 803 for selecting "CamA", a button 804 for selecting "CamB", and a button 805 for selecting "CamC" are displayed. By displaying the camera selection area 802 on the photographed image, the user is enabled to select a camera for transmitting segments while checking a moving image which the user himself/herself is photographing.

Figure 7:
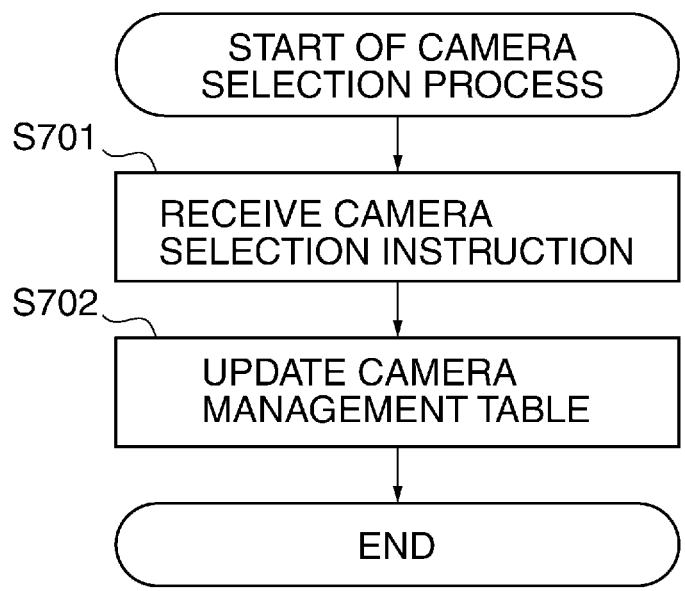
FIG. 7 is a flowchart of a camera selection process executed by the PC in the first embodiment.

FIG. 7 is a flowchart of the camera selection process executed by the camera 100a according to the first embodiment. The camera selection process is started at the same time when the camera selection screen shown in FIG. 8A is displayed. That is, this process is executed following the streaming starting process in FIG. 5. Although in the present embodiment, the flowcharts are separated for the convenience of description, the respective processes indicated by these flowcharts may be realized by executing separate programs, or may be realized by executing one program. This also applies to the flowcharts of following processes to be executed by the camera 100a.

In a step S701, the controller 101 receives a camera selection instruction from the user via the operating section 105. The user operates the operating section 105 while referring to the camera selection screen 802 shown in FIG. 8A.

In a step S702, the controller 101 updates the camera management table based on the camera selection instruction in the step S701. For example, FIG. 6B shows an example of the camera management table updated when "CamB" is selected in the step S701. As shown in FIG. 6B, a box of the column of "video source" associated with "CamB" is changed to "YES", and corresponding boxes associated with the other cameras are set to "NO". Thus, in place of video data photographed by the camera 100a, video data photographed by the camera 100b or 100c can be distributed to the PC 200 as the video source in response to the request from the PC 200. A procedure for changing the video source to be distributed from the video distributor side according to the update of the table will be described with reference to FIG. 9.

FIG. 9 is a sequence diagram showing a communication order in streaming distribution between the three cameras 100a to 100c and the PC 200. It is assumed in the present embodiment that as the initial state, the above-described streaming starting process has been completed, and the camera management table shown in FIG. 6A has been generated in the RAM 102.

In a step S901, an instruction for connecting to the camera 100a is input by a user's operation on the PC 200. For example, the streaming application screen (not shown) is displayed on the display section 203 of the PC 200, and the user selects a camera which provides a streaming image desired to be displayed, whereby the connection instruction is input.

In a step S902, the controller 101 of the camera 100a receives a playlist acquisition request sent from the PC 200 via the wireless communication section 107. The playlist acquisition request is a request message sent using the HTTP GET request, and the URI is described as "http://10.1.123.101/playlist", as mentioned hereinabove.

The controller 101 of the camera 100a analyzes the URI to thereby determine that the received request is a playlist acquisition request, and generates a playlist in the RAM 102 based on the contents of the latest camera management table (FIG. 6A).

In FIG. 6A, the camera having "YES" in the column of "video source" is "CamA", and hence the segment acquisition URI is set as "http://10.1.123.101/segment1.ts" based on the IP address of "CamA". FIG. 4C shows an example of the playlist generated in the step S902.

In a step S903, the controller 101 of the camera 100a transmits the generated playlist to the PC 200 via the wireless communication section 107. The playlist is transmitted as an HTTP response.

In a step S904, the controller 201 of the PC 200 sends a segment acquisition request to the camera 100a based on the segment acquisition URI described in the playlist received in the step S903.

The controller 101 of the camera 100a receives the segment acquisition request sent from the PC 200 via the wireless communication section 107 (S904). The URI of this HTTP request is described as "http://10.1.123.101/segment1.ts", as shown in FIG. 4C. The controller 101 of the camera 100a analyzes the URI to thereby determine that the received request is a segment acquisition request, and generates, using a photographed image input from the image pickup section 103, a segment in a file format of MPEG2 transport stream as five-second moving image data.

In a step S905, the controller 101 of the camera 100a transmits the generated segment to the PC 200 via the wireless communication section 107. The segment is transmitted as an HTTP response.

Upon receipt of the segment, the PC 200 performs decode processing on the segment and then displays a moving image on the display section 203. Note that in FIG. 9, a downward arrow on which "display" is written indicates a reproduction time period of the moving image.

Now, it is assumed here by way of example that in a step S906, the controller 101 of the camera 100a receives via the operating section 105 a user's instruction for selecting a camera that performs segment transmission. The process to be executed in this step (camera selection process) has been described in detail with reference to FIG. 7, and hence description thereof is omitted. In this step, it is assumed, by way of example, that "CamB" is selected and the camera management table is updated to the table shown in FIG. 6B. The following description is continued based on this assumption.

After the camera management table has been updated in the step S906, in a step S907, the controller 101 of the camera 100a receives a playlist acquisition request sent from the PC 200 via the wireless communication section 107. The playlist acquisition request has the same contents as that received in the step S902.

The controller 101 of the camera 100a analyzes the URI to thereby determine that the received request is a playlist acquisition request, and generates a playlist in the RAM 102 based on the contents of the latest camera management table (FIG. 6B).

In FIG. 6B, the camera having "YES" in the column of "video source" is "CamB", and hence the segment acquisition URI is described as "http://10.1.123.102/segment2.ts" based on the IP address of the CamB. FIG. 4D shows an example of the playlist generated in this step.

Referring to FIG. 4D, the sequence number, denoted by a reference numeral 408, on the playlist is incremented by one to 2. The segment acquisition URI denoted by a reference numeral 409 is changed to "http://10.1.123.102/segment2.ts" based on the IP address of CamB, as mentioned above. The file name is changed such that the indicated segment is a second segment. However, this change is not necessarily required, and the file name may be described as "segment1.ts".

In a step S908, the controller 101 of the camera 100a transmits the generated playlist to the PC 200 via the wireless communication section 107. This step is the same as the step S903.

In a step S909, the controller 201 of the PC 200 sends a segment acquisition request based on the segment acquisition URI described in the playlist received in the step S908. This process is the same as the steps S304 and S308 in FIG. 5. However, in the playlist transmitted from the camera 100a to the PC 200 in the step S903, the segment acquisition URI is described not based on the IP address of the camera 100a, but based on the IP address of the camera 100b. Therefore, in this step, the segment acquisition request is sent not to the camera 100a, but to the camera 100b. Thus, the PC 200 sends a request based on the URI described in the playlist similarly to the one-to-one streaming distribution. That is, by properly changing the URI described in the playlist at the video distributor, it is possible to switch between the video sources, from the video distributor side, without requesting a specific operation from the PC 200.

The controller 101 of the camera 100b receives the segment acquisition request sent from the PC 200 (segment acquisition request reception).

The controller 101 of the camera 100b analyzes the URI to thereby determine that the received request is a segment acquisition request, and generates, using a photographed image input from the image pickup section 103 of the camera 100b, a segment in the file format of MPEG2 transport stream as five-second moving image data.

In a step S910, the controller 101 of the camera 100b transmits the generated segment to the PC 200. The segment is transmitted as an HTTP response. Upon receipt of the segment, the PC 200 performs decode processing on the received segment, and seamlessly displays the moving image on the display section 203 after completion of reproduction of the segment received in the step S905.

Note that when the controller 201 of the PC 200 has acquired a segment (all segments, if given in plurality) described in the playlist received from the camera 100a, the controller 201 requests the playlist not from the camera 100b, but from the camera 100a so as to receive the next segment(s). Then, the controller 201 similarly sends a segment acquisition request to a segment acquisition URI described in the playlist.

According to the above-described first embodiment, in the camera 100a, the management information (camera management table) of a plurality of cameras which are capable of performing streaming distribution to the PC 200 is registered, and selection of a camera that is to perform streaming distribution to the PC 200 is received on the camera selection screen. Then, the camera 100a updates the camera management table such that the selected camera is to perform streaming distribution to the PC 200. Upon receipt of a playlist acquisition request from the PC 200, the camera 100a generates a playlist based on the updated camera management table, and sends the generated playlist to the PC 200 as a response. This makes it possible, in the network environment shown in FIG. 1 in which streaming distribution can be performed from a plurality of cameras to the PC 200, to switch between videos to be displayed on a reproduction apparatus (PC 200) that reproduces a streaming moving image, using the camera 100a which is a distributor.

Although in the above-described first embodiment, the camera 100a has been described as an example of the communication apparatus, the image pickup function is not an essential requirement of the present invention. Further, the present invention can be applied to a PC, a tablet terminal, a smartphone, etc., insofar as it can execute the streaming starting process, the camera selection process, and the playlist transmission process, even without the segment transmission function.

Next, a description will be given of a second embodiment of the present invention. The same components as those of the first embodiment are denoted by the same reference numerals, and description thereof is omitted. The following description is given mainly of different points.

In the second embodiment, in the streaming starting process described with reference to FIG. 5, a configuration is added for displaying an approximate remaining time period to be taken until the photographed image being displayed on the PC 200 is changed to an image photographed by the selected camera after the camera selection instruction is received.

Figure 8B:
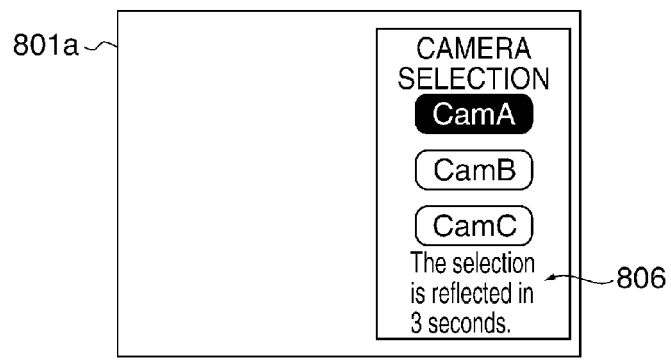
FIG. 8B is a diagram showing an example of a camera selection screen displayed on a display section of a PC in a second embodiment.

In the step S503 in FIG. 5, the controller 101 displays a camera selection screen 801a shown in FIG. 8B on the display section 104 to thereby make the self-apparatus capable of receiving a camera selection instruction from a user via the operating section 105.

In FIG. 8B, a reference numeral 806 denotes an area displaying the approximate remaining time period to be take until the photographed image being displayed on the PC 200 is changed to an image photographed by the selected camera after the camera selection instruction is received.

Here, a method of calculating the remaining time displayed on the area 806 will be described with reference to FIG. 10.

Figure 10:
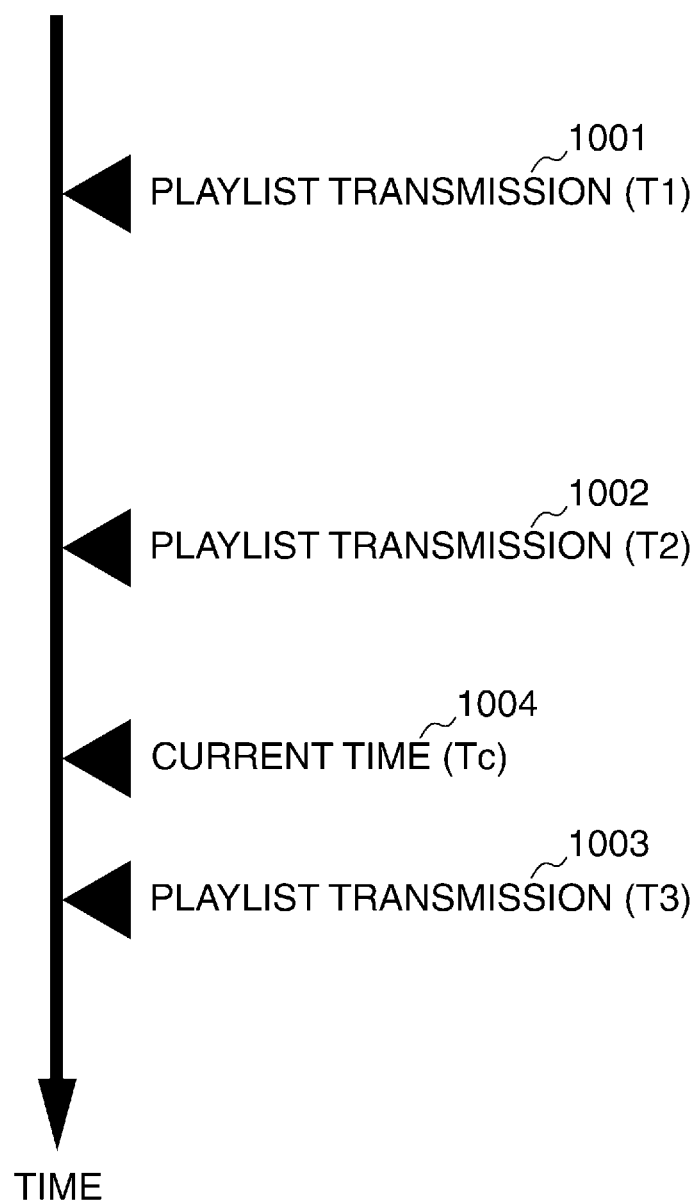
FIG. 10 is a diagram showing an example of time intervals of transmission of playlists in HLS.

Referring to FIG. 10, reference numerals 1001 and 1002 denote time points at which playlists were transmitted from the camera 100a, respectively, and a reference numeral 1003 denotes a time point at which a playlist is to be transmitted from the camera 100a, and a reference numeral 1004 denotes the current time. The time points 1001, 1002, and 1003 correspond to timings at which the steps S903 and S908 in FIG. 9 are executed.

Generally, in HLS, a time interval of the playlist acquisition request transmission depends on the reproduction time period over which reproduction including decoding is executed. In the present embodiment, a reproduction time period per segment is basically set to a fixed time period (five seconds), and hence as shown in FIG. 10, playlist transmission is performed at a constant period, and the time interval is considered to be equal to the reproduction time period of each segment.

Although a time period to elapse from receipt of a segment to start of reproduction of the segment on the PC 200 depends on the method of controlling the PC 200, a reception buffer size is generally optimized, and hence the time period to elapse from receipt of the segment to start of reproduction thereof can be considered to be very short compared with the reproduction time period of the segment. Further, processing from playlist transmission to segment transmission is synchronous processing, and hence this processing is executed within a very short time period, compared with the reproduction time period of the segment. Therefore, the approximate remaining time period to be taken until the photographed image being displayed on the PC 200 is changed to an image photographed by the selected camera after the camera selection instruction is received is a value obtained by subtracting the current time from the time at which a playlist is to be transmitted next. This value is equal to T3–Tc in the example illustrated in FIG. 10.

By using the above-described method, it is possible to calculate the approximate remaining time period displayed on the area 806 in FIG. 8B. More specifically, the controller 101 can calculate a time difference between a time at which a playlist is to be transmitted next and the current time, by storing, in the RAM 102, information on the time at which the playlist has been transmitted. It is possible to realize the above-described added configuration by always displaying the calculated time difference on the display section 104.

According to the above-described second embodiment, the approximate remaining time period to be taken until the photographed image being currently displayed on the PC 200 is changed is always displayed on the camera selection screen. This enables the user to input a camera selection instruction while taking the timing into consideration.

Next, a description will be given of a third embodiment of the present invention. The same components as those of the first embodiment are denoted by the same reference numerals, and description thereof is omitted. The following description is given mainly of different points.

The third embodiment differs from the first embodiment in that images photographed by the three cameras 100a to 100c of the network system shown in FIG. 1 are caused to be displayed on the camera selection screen by the streaming starting process in FIG. 5.

Figure 11:
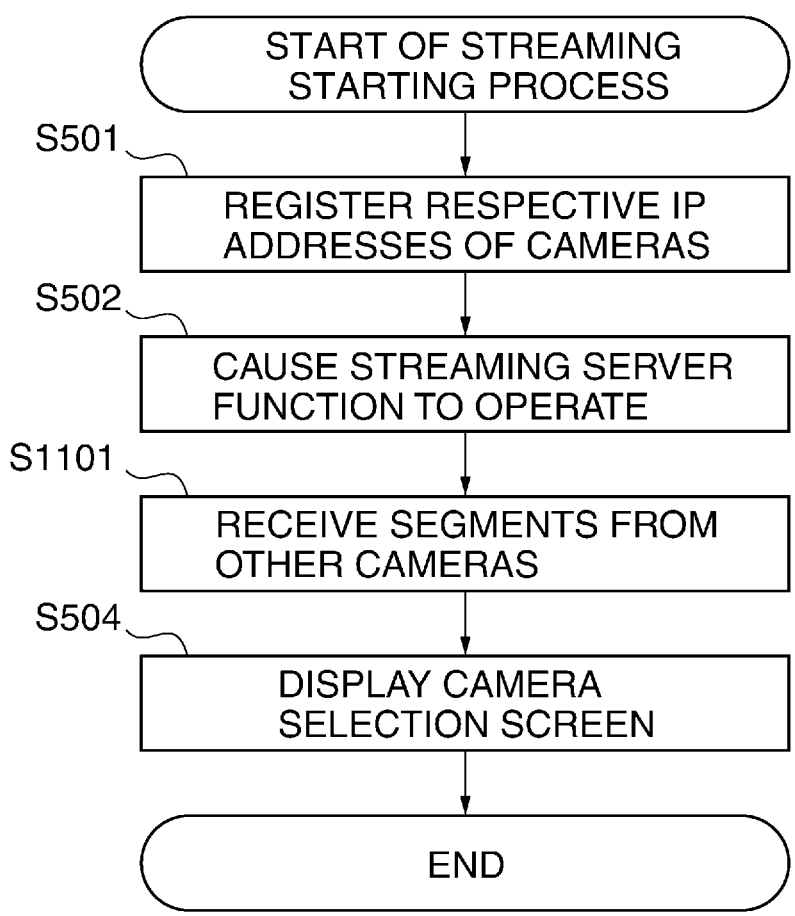
FIG. 11 is a flowchart of a streaming starting process executed by a camera as a communication apparatus according to the third embodiment of the present invention.

FIG. 11 is a flowchart of a streaming starting process performed by the camera 100a as a communication apparatus according to the third embodiment. Note that the steps described in the process in FIG. 5 are denoted by the same step numbers, and description thereof is omitted.

In a step S1101, the controller 101 sends a segment acquisition request to the cameras 100b and 100c which have been registered in the step S501, respectively, and receives segments (segment reception). This processing is the same as the processing executed in the steps S904 and S905 in FIG. 9 except that the PC 200 is replaced by the camera 100a, and the camera 100a is replaced by the cameras 100b and 100c. The segment acquisition URI is generated based on the registered IP addresses.

Figure 8C:
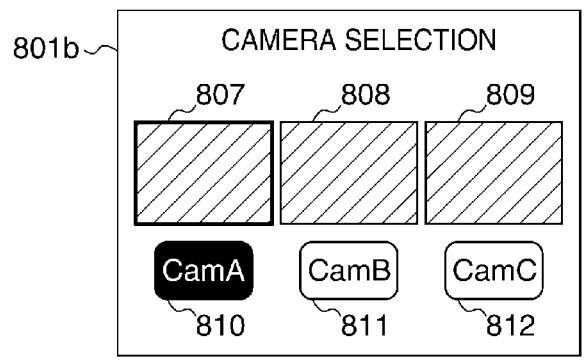
FIG. 8C is a diagram showing an example of a camera selection screen displayed on a display section of a PC in a third embodiment.

Next, in a step S504, the controller 101 displays a camera selection screen 801b shown in FIG. 8C on the display section 104 based on the segments received in the step S1101.

Referring to FIG. 8C, a reference numeral 807 denotes an image photographed by the camera 100a, which corresponds to the photographed image displayed on the camera selection screen 801 in FIG. 8A. A reference numeral 808 denotes an image photographed by the camera 100b, which is received in the step S1101 in FIG. 11. A reference numeral 809 denotes an image photographed by the camera 100c, which is received in the step S1101 in FIG. 11.

A reference numeral 810 denotes a button for selecting the camera 100a, which corresponds to the button 803 in FIG. 8A. A reference numeral 811 denotes a button for selecting the camera 100b, which corresponds to the button 804 in FIG. 8A. A reference numeral 812 denotes a button for selecting the camera 100c, which corresponds to the button 805 in FIG. 8A.

Note that processing for receiving the segments, which is executed in the step S1101 in FIG. 11, is repeatedly executed so as to realize the live streaming display on the display section 104.

According to the third embodiment, images photographed by a plurality of cameras on the video distributor side are displayed on the camera selection screen, whereby the user can input a camera selection instruction while checking the images photographed by the plurality of cameras.

Hereafter, a description will be given of a fourth embodiment of the present invention. The same components as those of the first embodiment are denoted by the same reference numerals, and description thereof is omitted. The following description is given mainly of different points.

The fourth embodiment differs from the first embodiment in that processing for determining whether or not the cameras 100b and 100c are in operation is added.

Figure 12:
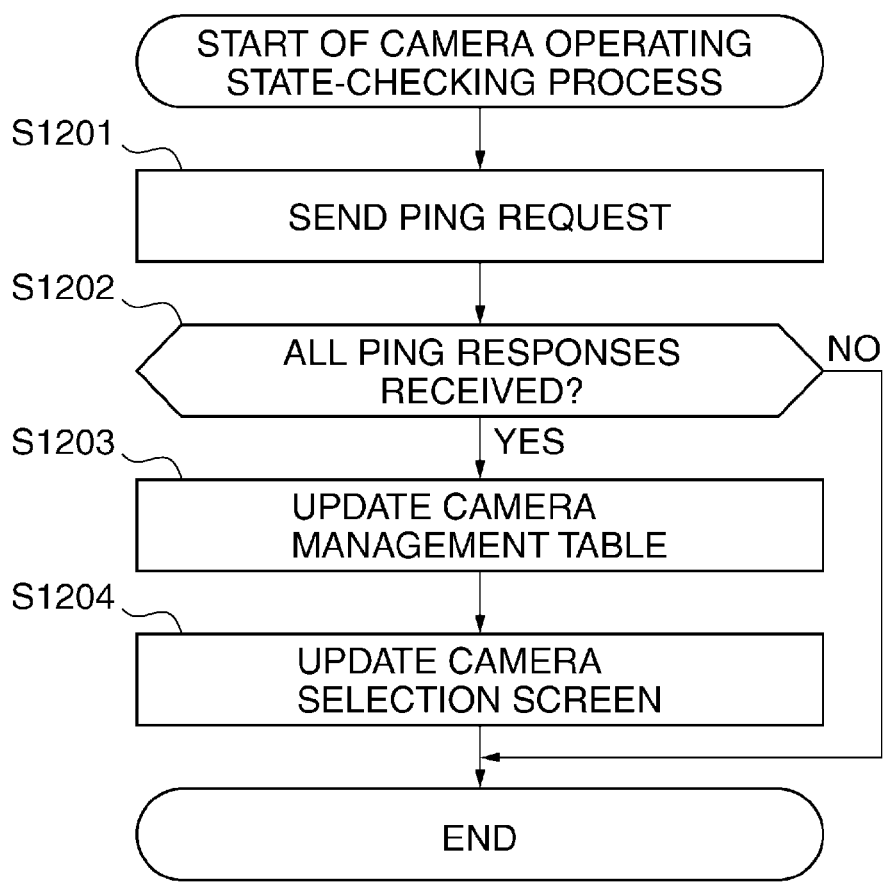
FIG. 12 is a flowchart of a camera operating state-checking process executed by a camera as a communication apparatus according to the fourth embodiment of the present invention.

FIG. 12 is a flowchart of a camera operating state-checking process executed by the camera 100a as a communication apparatus according to the fourth embodiment, for checking the operating state of the streaming server function of each of the cameras 100b and 100c.

In a step S1201, the controller 101 sends a PING request (checking request) using the ICMP protocol to the cameras 100b and 100c.

Next, in a step S1202, the controller 101 determines whether or not all PING responses have been received within a predetermined time period, and if any PING response has not been received, the process proceeds to a step S1203, whereas if all the PING responses are received, the present process is immediately terminated. In this process, a short time period shorter than one second is suffice for the predetermined time period.

In the step S1203, the controller 101 determines that a camera other than the self-apparatus from which no response has been received is not operation, and updates the camera management table. FIG. 6C shows an example of the updated camera management table.

FIG. 6C is a diagram showing an example of the camera management table updated in a case where no PING response has been received from the camera 100c.

Referring to FIG. 6C, a rightmost column of "PING response" indicates results of response to PING transmission. The initial setting is "received".

Figure 8D:
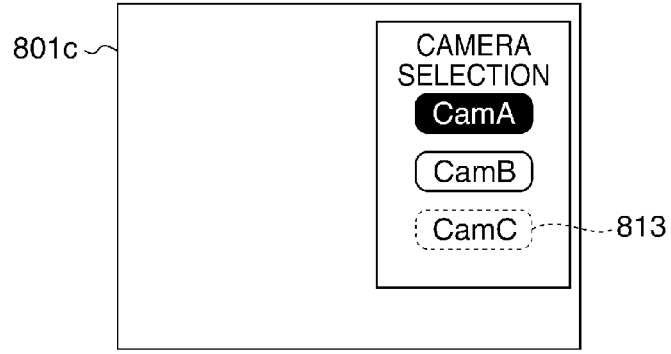
FIG. 8D is a diagram showing an example of a camera selection screen displayed on a display section of a PC in the fourth embodiment.

Referring again to FIG. 12, in a step S1204, the controller 101 updates the camera selection screen based on the latest camera management table. More specifically, a camera from which no PING response has been received is disabled for selection by the selection button. FIG. 8D shows an example of the updated camera selection screen. In the camera management table shown in FIG. 6C, a box of the column "PING response" associated with "CamC" indicates "not received", and hence the selection button, denoted by a reference numeral 813, for "CamC" is displayed in an unselectable manner, i.e. grayed out, on the camera selection screen 801c shown in FIG. 8D.

The camera operating state-checking process described with reference to FIG. 12 is periodically executed after the streaming server function is started to operate (e.g. at one-second intervals). As a consequence, even when the cameras 100b and 100c become unable to transmit segments due to some cause, such as a dead battery and power-off, the states of the cameras are reflected on the camera selection screen, which makes it possible to prevent a camera incapable of transmitting segments from being selected.

Further, the camera operating state-checking process may be executed with respect to a selected camera immediately after a camera selection instruction is input on the camera selection screen. In this case, the configuration may be such that if no PING response is received from the selected camera, an error is notified to the user, and selection of the camera is canceled.

According to the fourth embodiment, by executing the camera operating state-checking process, if any camera becomes incapable of transmitting segments due to some cause, the PC 200 is prevented from sending a segment acquisition request to the camera. This makes it possible to prevent interruption of image display on the PC 200.

Note that the camera operating state-checking process in the fourth embodiment can be executed in combination with the second and third embodiments.

Although in the first to fourth embodiments, a personal computer (PC) is taken as an example of the moving image reproduction apparatus which is a streaming distribution receiver, this is not limitative. For example, the moving image reproduction apparatus may be a smartphone or a mobile information terminal. Further, the network environment is not limited to the one shown in FIG. 1, and the number of cameras which are each an example of the communication apparatus is not limited to three. Further, although the digital camera is used as the communication apparatus, this is not limitative.

Hereafter, a description will be given of a fifth embodiment of the present invention. The same components as those of the first embodiment are denoted by the same reference numerals, and description thereof is omitted. The following description is given mainly of different points.

In the above-described embodiments, to simplify the description, the description has been given taking, as an example, the case where one segment acquisition URI is described in one playlist as an example. On the other hand, in the present embodiment, the description will be given taking, as an example, a case where a plurality of segment acquisition URIs are described in one playlist.

Figure 13A:
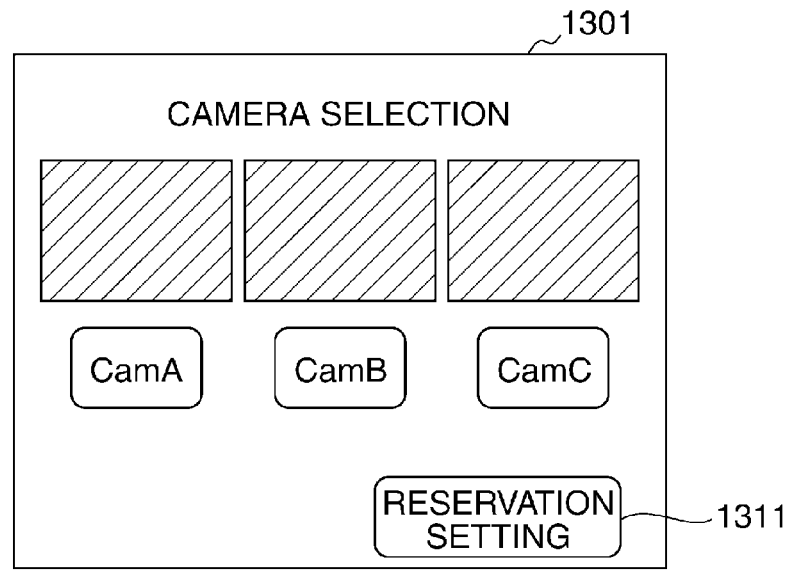
FIG. 13A is a diagram showing an example of a screen displayed on a camera as a communication apparatus according to a fifth embodiment.

FIG. 13A shows an example of a screen displayed on the display section 104 of the camera 100a of the present embodiment. This screen, denoted by a reference numeral 1301, is formed by adding a reservation setting button 1311 to the screen shown in FIG. 8C. On this screen, the user of the camera 100a can set reservation of switching between cameras that perform streaming distribution by selecting the reservation setting button 1311. Upon receipt of selection of the reservation setting button 1311 from the user on the screen 1301, the screen is changed to a screen 1302 shown in FIG. 13B.

Figure 13B:
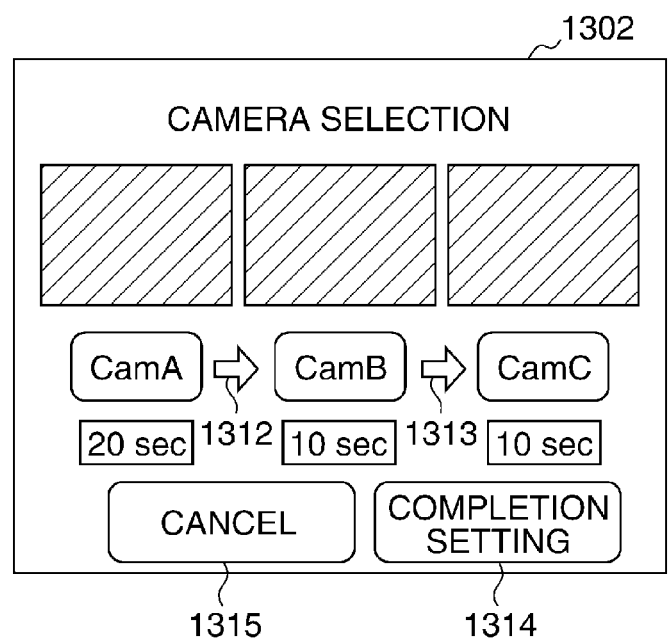
FIG. 13B is a diagram showing an example of a screen displayed on the camera as the communication apparatus according to the fifth embodiment.

On the screen 1302 shown in FIG. 13B, the user can set an order of cameras which perform video distribution and respective time periods over which the cameras perform video distribution, and whether or not to perform video distribution. First, whenever each of icons (CamA to CamC) of the cameras 100a to 100c is selected, the associated camera is toggled between a state set for video distribution and a state not set for video distribution. In the state set for video distribution, the icon is normally displayed, whereas in the state not set for video distribution, the icon is displayed in a grayed-out manner. Further, by selecting arrow icons 1312 and 1313 arranged between the icons of the cameras 100*a* to 100*c*, it is possible to interchange the positions of the icons of the cameras 100*a* to 100*c* on the opposite sides of the respective arrow icons. More specifically, during the display of the screen 1302, by operating the cross key included in the operating section 105, focus is set on an arrow icon. The focus may be indicated by slightly increasing the displayed size of the arrow icon, or by changing the color of the same. That is, the arrow icon is displayed in such a manner that the user can notice that focus is set thereon. Then, by operating the cross key, the arrow icon on which focus is set can be changed to another arrow icon. In the example illustrated in FIG. 13B, in a state of focus being set on the arrow icon 1312, by pressing a right key of the cross key, focus can be set on an arrow icon 1313, and vice versa. In a state in which focus is set on an arrow icon, when the user presses a set button, not shown, included in the operating section 105, the arrow icon can be selected. For example, in a state in which focus is set on the arrow icon 1312, by pressing the set button, the arrow icon 1312 is selected, whereby the icon CamA and the icon CamC are caused to change places.

FIG. 13B shows a state in which the camera B and the camera C have changed places from the state shown in FIG. 13A. In this case, video distribution is sequentially performed by the camera A, the camera C, and the camera B, in the mentioned order. That is, video distribution is started in the order from the camera whose icon is displayed on the left side to the camera displayed on the right side. Note that the operation for causing the icons to change places is not limited to selection of an associated arrow icon. For example, the icon A and the icon C may be caused to change places, using a touch panel, which is mounted on each camera, by dragging the icon A to an area where the icon C is displayed (so-called drag operation in which touching down on a point selected on the screen displayed on the touch panel with a finger or the like, and moving the touched point while maintaining the touched state), and dropping the icon A in a predetermined area including the area in which the icon C is displayed (so-called drop operation in which the finger or the like is removed from the screen, to change the touched state to the untouched state). This applies to another combination of two of the icons.

Further, an area is provided below each camera icon for setting and displaying a time period over which video distribution is to be performed from the camera. The user selects a video distribution time period using a pull-down menu displayed by selecting this area to thereby set the video distribution time period. However, the method of setting the video distribution time period is not limited to selection using the pull-down menu, but for example, the video distribution time period may be set by displaying a software keyboard, and receiving a user's input.

Finally, when the user selects a setting completion button 1314, generation of a playlist is started. For example, when the setting completion button 1314 is selected in the state shown in FIG. 13B, a playlist shown in FIG. 14 is generated. The generated playlist is transmitted to the PC 200 upon receipt of the request from the PC 200. As a result, the PC 200 requests a segment from the camera A first, as described in the playlist, and reproduces a moving image based on the received segment. Then, in parallel with reproduction of the moving image, the PC 200 requests a segment from the camera C, and further receives the segment from the camera C. Reproduction of the moving image based on the segment received from the camera C is performed in a manner seamlessly continued from reproduction of the moving image based on the segment received from the camera A. Similarly, the PC 200 requests a segment also from the camera B during reproduction of the segment received from the camera C, and seamlessly continues to reproduce the moving image based on the segment received from the camera B. When all of the segments described in the playlist have been acquired, the PC 200 sends a request for a playlist to the camera 100*a* again. This request is also sent in parallel with reproduction of the moving image. At this time, unless the setting of the camera 100*a* is changed, the above operations are repeated again. If the setting of the camera 100*a* is changed, the PC 200 receives a changed playlist, and repeats requesting segments according to the segment acquisition URIs described in the playlist.

If the user does not intend to make the reservation setting itself, it is only required to select a cancel button 1315 displayed on the screen 1302 shown in FIG. 13B. In this case, the screen returns to the screen 1301 shown in FIG. 13A.

As described above, in the present embodiment, a playlist is generated which describes segment acquisition URIs of a plurality of cameras. This makes it possible to distribute videos from the respective cameras in an automatically switching manner by once making the setting, and thereby save the user of the camera 100*a* time and effort.

According to the present invention, in a network environment in which streaming distribution of video data can be performed from a plurality of communication apparatuses to a reproduction apparatus, it is possible to switch between videos to be displayed on the reproduction apparatus based on the video data subjected to the streaming distribution, from a video distributor side.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-163129 filed Aug. 6, 2013, which is hereby incorporated by reference herein in its entirety.

What is claimed is:

1. A communication apparatus that distributes, according to a segment request from an external apparatus, segments obtained by dividing video data to the external apparatus, comprising:
a wireless communication unit configured to communicate with the external apparatus; and
a control unit configured to control the communication apparatus,
wherein the control unit performs following steps:
generating a segment list describing information on a distribution source of each segment;
transmitting via the wireless communication unit the segment list in response to a request from the external apparatus, for acquiring the segment list;
holding management information of a plurality of other communication apparatuses that are capable of distributing data to the external apparatus; and
receiving, from a user, selection of a communication apparatus that is to distribute data to the external apparatus, out of the communication apparatuses of which the management information is held,
wherein when the selection of a communication apparatus that is to distribute data to the external apparatus is received from the user, said control unit generates a segment list such that the communication apparatus selected by the user is set as the distribution source of the segment, and
wherein the segment list generated such that the communication apparatus selected by the user is set as the distribution source of the segment is transmitted via the wireless communication unit in response to the request from the external apparatus for acquiring the segment list.

2. The communication apparatus according to claim 1, wherein said control unit holds not only management information of the other communication apparatuses, but also management information of the self-apparatus.

3. The communication apparatus according to claim 1, wherein said control unit calculates a reception time at which a request for acquiring a next playlist is to be received, based on a time at which the request for acquiring the playlist has been received, a reproduction time period per segment, and the current time, and notifying the user of a time period remaining until the calculated time.

4. The communication apparatus according to claim 1, wherein said control unit transmits via the wireless communication unit a checking request to each communication apparatus for checking whether or not the communication apparatus is in a state capable of distributing data to the external apparatus, and
wherein when no response to the checking request sent via the wireless communication unit is received, said control unit changes the segment list such that a communication apparatus from which no response is received is not set as the distribution source of a segment.

5. The communication apparatus according to claim 1, wherein said control unit sends a segment acquisition request to each of the plurality of communication apparatuses;
wherein said control unit receives segments from the plurality of communication apparatuses, and
wherein receipt of selection of a communication apparatus that is to distribute data to the external apparatus is performed, in parallel with displaying of at least one of moving images based on the received segments, and a moving image which can be distributed from the self-apparatus to the moving image reproduction apparatus.

6. The communication apparatus according to claim 1, wherein the management information includes a URI of the self-apparatus which holds the management information and respective URIs of the plurality of communication apparatuses.

7. The communication apparatus according to claim 1, wherein communication with the external apparatus is performed over the Internet.

8. A reproduction apparatus that communicates with a communication apparatus that is capable of transmitting segments obtained by dividing video data, and a plurality of other communication apparatuses that are capable of communicating with the communication apparatus, comprising:
a wireless communication unit configured to communicate with the external apparatus; and
a control unit configured to control the communication apparatus,
wherein the control unit performs following steps:
transmitting via the wireless communication unit a request for a segment list describing information on a distribution source of each segment to the communication apparatus;
receiving via the wireless communication unit the segment list from the communication apparatus;
receiving via the wireless communication unit the segment from a communication apparatus determined, based on the information on the distribution source described in the segment list received, out of a communication apparatus which is a transmission source of the segment list and one or a plurality of other communication apparatuses connected to the communication apparatus which is the transmission source of the segment list; and
reproducing video data based on the segment received,
wherein when segments have been received via the wireless communication unit from each communication apparatus determined based on information on all distribution sources described in the segment list, said control unit again transmits via the wireless communication unit a segment list acquisition request to the communication apparatus of the plurality of communication apparatuses, which is the transmission source of the segment list.

9. The reproduction apparatus according to claim 8, wherein said control unit receives via the wireless communication unit the segment in parallel with reproduction of the video data.

10. The reproduction apparatus according to claim 8, wherein said control unit receives via the wireless communication unit the segment list in parallel with reproduction of the video data.

11. The reproduction apparatus according to claim 8, wherein said control unit does not transmit via the wireless communication unit a request for the segment list to the one or the plurality of other communication apparatuses connected to the communication apparatus which is the transmission source of the segment list.

12. The reproduction apparatus according to claim 8, wherein said control unit receives an instruction from a user,
wherein said control unit transmits via the wireless communication unit the request for the segment list in response to receipt of a video reproduction instruction, and
wherein a re-request for the segment list is automatically sent via the wireless communication unit without requiring an instruction from the user.

13. A method of controlling a communication apparatus that distributes, according to a segment request from an external apparatus, segments obtained by dividing video data to the external apparatus, comprising:
- generating a segment list describing information on a distribution source of each segment;
- transmitting the segment list in response to a request from the external apparatus, for acquiring the segment list;
- holding management information of a plurality of other communication apparatuses that are capable of distributing data to the external apparatus; and
- receiving, from a user, selection of a communication apparatus that is to distribute data to the external apparatus, out of the communication apparatuses of which the management information is held by said holding,
- wherein when the selection of a communication apparatus that is to distribute data to the external apparatus is received from the user by said receiving, said generating includes generating a segment list such that the communication apparatus selected by the user is set as the distribution source of the segment, and
- wherein said transmitting includes transmitting the segment list generated such that the communication apparatus selected by the user is set as the distribution source of the segment, in response to the request from the external apparatus for acquiring the segment list.

14. A method of controlling a reproduction apparatus that communicates with a communication apparatus that is capable of transmitting segments obtained by dividing video data, and a plurality of other communication apparatuses that are capable of communicating with the communication apparatus, comprising:
- transmitting a request for a segment list describing information on a distribution source of each segment to the communication apparatus;
- receiving the segment list from the communication apparatus;
- receiving the segment from a communication apparatus determined, based on the information on the distribution source described in the received segment list, out of a communication apparatus which is a transmission source of the segment list and one or a plurality of other communication apparatuses connected to the communication apparatus which is the transmission source of the segment list; and
- reproducing video data based on the received segment,
- wherein said transmitting includes transmitting, when segments have been received from each communication apparatus determined based on information on all distribution sources described in the segment list, a segment list acquisition request to the communication apparatus of the plurality of communication apparatuses, which is the transmission source of the segment list.

15. A non-transitory computer-readable storage medium storing a computer-executable program for executing a method of controlling a communication apparatus that distributes, according to a segment request from an external apparatus, segments obtained by dividing video data to the external apparatus,
wherein the method comprises:
- generating a segment list describing information on a distribution source of each segment;
- transmitting the segment list in response to a request from the external apparatus, for acquiring the segment list;
- holding management information of a plurality of other communication apparatuses that are capable of distributing data to the external apparatus; and
- receiving, from a user, selection of a communication apparatus that is to distribute data to the external apparatus, out of the communication apparatuses of which the management information is held by said holding,
- wherein when the selection of a communication apparatus that is to distribute data to the external apparatus is received from the user by said receiving, said generating includes generating a segment list such that the communication apparatus selected by the user is set as the distribution source of the segment, and
- wherein said transmitting includes transmitting the segment list generated such that the communication apparatus selected by the user is set as the distribution source of the segment, in response to the request from the external apparatus, for acquiring the segment list.

16. A non-transitory computer-readable storage medium storing a computer-executable program for executing a method of controlling a reproduction apparatus that communicates with a communication apparatus that is capable of transmitting segments obtained by dividing video data, and a plurality of other communication apparatuses that are capable of communicating with the communication apparatus,
wherein the method comprises:
- transmitting a request for a segment list describing information on a distribution source of each segment to the communication apparatus;
- receiving the segment list from the communication apparatus;
- receiving the segment from a communication apparatus determined, based on the information on the distribution source described in the received segment list, out of a communication apparatus which is a transmission source of the segment list and one or a plurality of other communication apparatuses connected to the communication apparatus which is the transmission source of the segment list; and
- reproducing video data based on the received segment,
- wherein said transmitting includes transmitting, when segments have been received from each communication apparatus determined based on information on all distribution sources described in the segment list, a segment list acquisition request to the communication apparatus of the plurality of communication apparatuses, which is the transmission source of the segment list.

* * * * *